US009116820B2

(12) United States Patent
Mylly (10) Patent No.: US 9,116,820 B2
(45) Date of Patent: Aug. 25, 2015

(54) DYNAMIC CENTRAL CACHE MEMORY

(75) Inventor: Kimmo J. Mylly, Ylojarvi (FI)

(73) Assignee: Memory Technologies LLC, Las Vegas, NV (US)

( * ) Notice: Subject to any disclaimer, the term of this patent is extended or adjusted under 35 U.S.C. 154(b) by 87 days.

(21) Appl. No.: 13/596,480

(22) Filed: Aug. 28, 2012

(65) Prior Publication Data

US 2014/0068140 A1    Mar. 6, 2014

(51) Int. Cl.
*G06F 12/08* (2006.01)
*G06F 12/02* (2006.01)

(52) U.S. Cl.
CPC ........ *G06F 12/0873* (2013.01); *G06F 12/0246* (2013.01); *G06F 12/0871* (2013.01); *G06F 2212/7207* (2013.01); *G06F 2212/7208* (2013.01)

(58) Field of Classification Search
CPC ............ G06F 12/0866; G06F 12/0871; G06F 12/0873; G06F 12/0246; G06F 2212/72
USPC ......................................... 711/113, 103, 118
See application file for complete search history.

(56) References Cited

U.S. PATENT DOCUMENTS

| | | | |
|---|---|---|---|
| 5,586,291 A | 12/1996 | Lasker et al. | |
| 5,802,069 A | 9/1998 | Coulson | |
| 5,924,097 A | 7/1999 | Hill et al. | |
| 6,115,785 A | 9/2000 | Estakhri et al. | |
| 6,513,094 B1 | 1/2003 | Magro | |
| 6,665,747 B1 | 12/2003 | Nazari | |
| 6,842,829 B1 | 1/2005 | Nichols et al. | 711/147 |
| 7,136,963 B2 * | 11/2006 | Ogawa et al. | 711/113 |
| 7,181,574 B1 | 2/2007 | Lele | |
| 7,321,958 B2 | 1/2008 | Hofstee et al. | 711/153 |
| 7,480,749 B1 | 1/2009 | Danilak | |
| 7,571,295 B2 | 8/2009 | Sakarda et al. | |
| 8,190,803 B2 | 5/2012 | Hobson et al. | 710/120 |
| 2002/0093913 A1 | 7/2002 | Brown et al. | |

(Continued)

FOREIGN PATENT DOCUMENTS

| | | |
|---|---|---|
| EP | 0481716 | 4/1992 |
| EP | 1763036 | 3/2007 |

(Continued)

OTHER PUBLICATIONS

Lin et al., "A NAND Flash Memory Controller for SD/MMC Flash Memory Card", IEEE Transactions of Magnetics, vol. 43, No. 2, (Feb. 2, 2007), pp. 933-935).

(Continued)

*Primary Examiner* — Charles Rones
*Assistant Examiner* — Andrew Russell
(74) *Attorney, Agent, or Firm* — Lee & Hayes, PLLC (57) ABSTRACT

The specification and drawings present a new apparatus, method and software related product for using a cache/central cache module/device (instead of e.g., system DRAM) which can serve multiple memory modules/devices. Each memory/IO module/device connected to the same memory network (e.g., via hub, bus, etc.) may utilize memory resources of this cache module/device either in a fixed manner using pre-set allocation of resources per the memory module/device, or dynamically using run-time allocation of new resources to an existing module/device per its request or to a new module/device connecting to the memory network (e.g., comprised in a host device) and possibly requesting memory resources.

22 Claims, 9 Drawing Sheets

(56) References Cited

U.S. PATENT DOCUMENTS

| | | | |
|---|---|---|---|
| 2002/0108014 A1 | 8/2002 | Lasser | 711/103 |
| 2003/0137860 A1 | 7/2003 | Khatri et al. | 365/63 |
| 2004/0010671 A1* | 1/2004 | Sampsa et al. | 711/165 |
| 2004/0049692 A1 | 3/2004 | Okamoto | |
| 2004/0203670 A1 | 10/2004 | King et al. | |
| 2004/0221124 A1 | 11/2004 | Beckert et al. | 711/202 |
| 2005/0010738 A1 | 1/2005 | Stockdale et al. | 711/170 |
| 2005/0071570 A1 | 3/2005 | Takasugl et al. | |
| 2006/0041888 A1 | 2/2006 | Radulescu et al. | |
| 2006/0069899 A1 | 3/2006 | Schoinas et al. | |
| 2006/0075147 A1 | 4/2006 | Schoinas et al. | |
| 2006/0075395 A1 | 4/2006 | Lee et al. | |
| 2007/0088867 A1 | 4/2007 | Cho et al. | 710/22 |
| 2007/0207854 A1 | 9/2007 | Wolf et al. | |
| 2007/0234006 A1 | 10/2007 | Radulescu et al. | |
| 2007/0283078 A1 | 12/2007 | Li et al. | 711/103 |
| 2008/0104291 A1 | 5/2008 | Hinchey | |
| 2008/0127131 A1 | 5/2008 | Gao et al. | |
| 2008/0162792 A1 | 7/2008 | Wu et al. | 711/103 |
| 2008/0228984 A1 | 9/2008 | Yu et al. | 710/308 |
| 2008/0281944 A1 | 11/2008 | Vorne et al. | |
| 2009/0106503 A1 | 4/2009 | Lee et al. | 711/149 |
| 2009/0157950 A1 | 6/2009 | Selinger | |
| 2009/0164705 A1 | 6/2009 | Gorobets | |
| 2009/0182940 A1* | 7/2009 | Matsuda et al. | 711/114 |
| 2009/0182962 A1 | 7/2009 | Khmelnitsky et al. | 711/162 |
| 2009/0198871 A1 | 8/2009 | Tzeng | |
| 2009/0210615 A1 | 8/2009 | Struk et al. | |
| 2009/0216937 A1 | 8/2009 | Yasufuku | 711/103 |
| 2009/0222629 A1 | 9/2009 | Yano et al. | |
| 2009/0307377 A1 | 12/2009 | Anderson et al. | 710/3 |
| 2009/0327584 A1 | 12/2009 | Tetrick et al. | |
| 2010/0005281 A1 | 1/2010 | Buchmann et al. | |
| 2010/0030961 A9 | 2/2010 | Ma et al. | |
| 2010/0037012 A1 | 2/2010 | Yano et al. | |
| 2010/0100648 A1 | 4/2010 | Madukkarumukumana et al. | |
| 2010/0106886 A1 | 4/2010 | Marcu et al. | 711/102 |
| 2010/0115193 A1 | 5/2010 | Manus et al. | |
| 2010/0161882 A1 | 6/2010 | Stern et al. | |
| 2010/0169558 A1 | 7/2010 | Honda et al. | 711/103 |
| 2010/0172180 A1 | 7/2010 | Paley et al. | 365/185.12 |
| 2010/0250836 A1 | 9/2010 | Sokolov et al. | |
| 2010/0293420 A1 | 11/2010 | Kapil et al. | 714/710 |
| 2010/0312947 A1 | 12/2010 | Luukkainen et al. | 711/103 |
| 2011/0082967 A1* | 4/2011 | Deshkar et al. | 711/103 |
| 2011/0099326 A1 | 4/2011 | Jung et al. | |
| 2011/0264860 A1 | 10/2011 | Hooker et al. | |
| 2011/0296088 A1 | 12/2011 | Duzly et al. | 711/103 |
| 2012/0102268 A1* | 4/2012 | Smith et al. | 711/113 |
| 2012/0131263 A1 | 5/2012 | Yeh | |
| 2012/0131269 A1* | 5/2012 | Fisher et al. | 711/103 |
| 2012/0210326 A1 | 8/2012 | Torr et al. | |
| 2013/0138840 A1 | 5/2013 | Kegel et al. | |
| 2013/0145055 A1 | 6/2013 | Kegel et al. | |
| 2013/0339635 A1 | 12/2013 | Amit et al. | |
| 2013/0346668 A1 | 12/2013 | Floman et al. | |
| 2015/0039819 A1 | 2/2015 | Luukkainen et al. | |

FOREIGN PATENT DOCUMENTS

| | | |
|---|---|---|
| JP | 59135563 | 8/1984 |
| JP | 2004021669 | 1/2004 |
| JP | 2007079724 | 3/2007 |
| JP | 2007115382 | 5/2007 |
| WO | WO-99/65193 A1 | 12/1999 |

OTHER PUBLICATIONS

"How to Boot an Embedded System for an emMC Equipped with a Microsoft FAT File System", AN2539 Numonyx Application Note, Nov. 2008, pp. 1-25.

Embedded MultiMediaCard (eMMC) Mechanical Standard, JESD84-C43, JEDEC Standard, JEDEC Solid State Technology Association, Jun. 2007.

Embedded MultiMediaCard (eMMC) Product Standard, High Capacity, JEDEC Solid State Technology Association, JEDEC Standard, JES 84-A42, Jun. 2007.

Li et al, "A Method for Improving Concurrent Write Performance by Dynamic Mapping Virtual Storage System Combined with Cache Management", 2011 IEEE $7^{th}$ International Conference of Parallel Distributed System, Dec. 7-8, 2011.

Apostolakis, Andreas, et al., "Software-Based Self-Testing of Symmetric Shared-Memory Multiprocessors", IEEE vol. 58, No. 12, Dec. 2009, 13 pgs.

The PCT Search Report and Written Opinion mailed Mar. 6, 2014 for PCT application No. PCT/US13/56980, 11 pages.

JEDEC Standard, "Embedded MultiMediaCard (eMMC) Product Standard, High Capacity," JESD84-A42, Jun. 2007, 29 pages.

JEDEC Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.

JEDEC Standard, "Embedded MultiMediaCard (eMMC) Mechanical Standard," JESD84-C43, Jun. 2007, 13 pages.

Translated Japanese Office Action mailed Jan. 7, 2015 for Japanese patent application No. 2013-103695, a counterpart foreign application of U.S. Pat. No. 8,307,180, 8 pages.

Numonyz, "How to boot an embedded system from an eMMCTM equipped with a Microsoft FAT file system." Application note AN2539, Nov. 2008, pp. 1-25.

Final Office Action for U.S. Appl. No. 13/527,745, mailed on Jan. 16, 2015, Matti Floman, "Virtual Memory Module", 22 pages.

Office Action for U.S. Appl. No. 13/358,806, mailed on Nov. 27, 2013, Kimmo J. Mylly, "Apparatus and Method to Provide Cache Move With Non-Volatile Mass Memory System", 26 pages.

Office Action for U.S. Appl. No. 14/520,030, mailed on Dec. 4, 2014, Olli Luukkainen, "Apparatus and Method to Share Host System RAM with Mass Storage Memory RAM", 6 pages.

Office action for U.S. Appl. No. 13/527,745, mailed on Jun. 23, 2014, Floman et al., "Virtual Memory Module", 13 pages.

Final Office Action for U.S. Appl. No. 13/358,806, mailed on Sep. 10, 2014, Kimmo J. Mylly, "Apparatus and Method to Provide Cache Move With Non-Volatile Mass Memory System", 27 pages.

PCT Search Report and Written Opinion mailed Apr. 16, 2014 for PCT application No. PCT/US13/49434, 8 pages.

Tanenbaum, "Structured Computer Organization", Prentice-Hall, Inc, 1984, 5 pages.

PCT Search Report mailed Feb. 25, 2015 for PCT application No. PCT/US2014/069616.

\* cited by examiner

Figure 2 (Priori Art)

| Configuration (fixed settings) in production environment | Configuration during (first) boot-up of the mobile device (fixed or dynamic settings) | Configuration (dynamic) while connecting new device to network devices |
|---|---|---|
| Production programmer configures both the cache memory module (70) and memory module (20) / IO module (30). After power up both devices will be aware of settings made and are ready to operate with each other, e.g. The memory module may store pieces of its FTL to the cache memory module | After (or during) the production phase when (first) power up sequence takes place, the memory module / IO modules may interrogate availability of a cache module/device, e.g., in the memory network inside a host (mobile) device. After detecting one there will be a handshake phase which may comprise to e.g., a request by the memory/IO module and/or an offer by the cache module memory resources allocation to finish the configuration. In later power up phases the devices may detect the configuration as already finished and there is no need to necessarily repeat this interrogation. | During operation of host mobile device there may be connection of UFS new devices, like UFS memory card (40), into the network of memory devices inside the host mobile device. In such case the memory card may interrogate if there is a cache device connected in the memory network. After finding one, a handshake to configure both parties may take place. After configuration is finished, the card may utilize the resources of the cache memory e.g., for storing pieces of its FTL to the cache. After the memory card is removed from the mobile device the configuration may be released from the cache memory (and card resets its configuration also while powered down). |

DYNAMIC CENTRAL CACHE MEMORY

TECHNICAL FIELD

The exemplary and non-limiting embodiments of this invention relate generally to memory storage systems, and, more specifically, relate to a central cache memory implementation.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

CPU central processing unit
D2D device-to-device
DRAM dynamic random access memory
eMMC embedded MultiMediaCard
FTL flash translation layer
HC host controller
HCI host controller interface
HW hardware
ID identification (number)
I/O, IO input output
JEDEC joint electron device engineering council
LAN local area network
LTE long term evolution
LTE-A long term evolution advanced
MMM mass memory module
MMC MultiMediaCard
MRAM magnetic random access memory
NFC near field communication
NVM non-volatile memory (e.g., NAND)
OS operations system
P2L physical to logical
PCRAM phase change random access memory
PDA personal digital assistant
RAM random access memory
RRAM resistive random access memory
SATAIO serial advanced technology attachment international organization
SD secure digital (microsd is just one form factor)
SRAM static random access memory
SSD solid state disk
SW software
UFS universal flash storage
VM volatile memory Various types of flash-based mass storage memories currently exist. A basic premise of so called managedNAND mass storage memory is to hide the flash technology complexity from the host system. A technology such as eMMC is one example. A managedNAND type of memory can be, for example, an eMMC, SSD, UFS or a microSD.

Figure 1A:
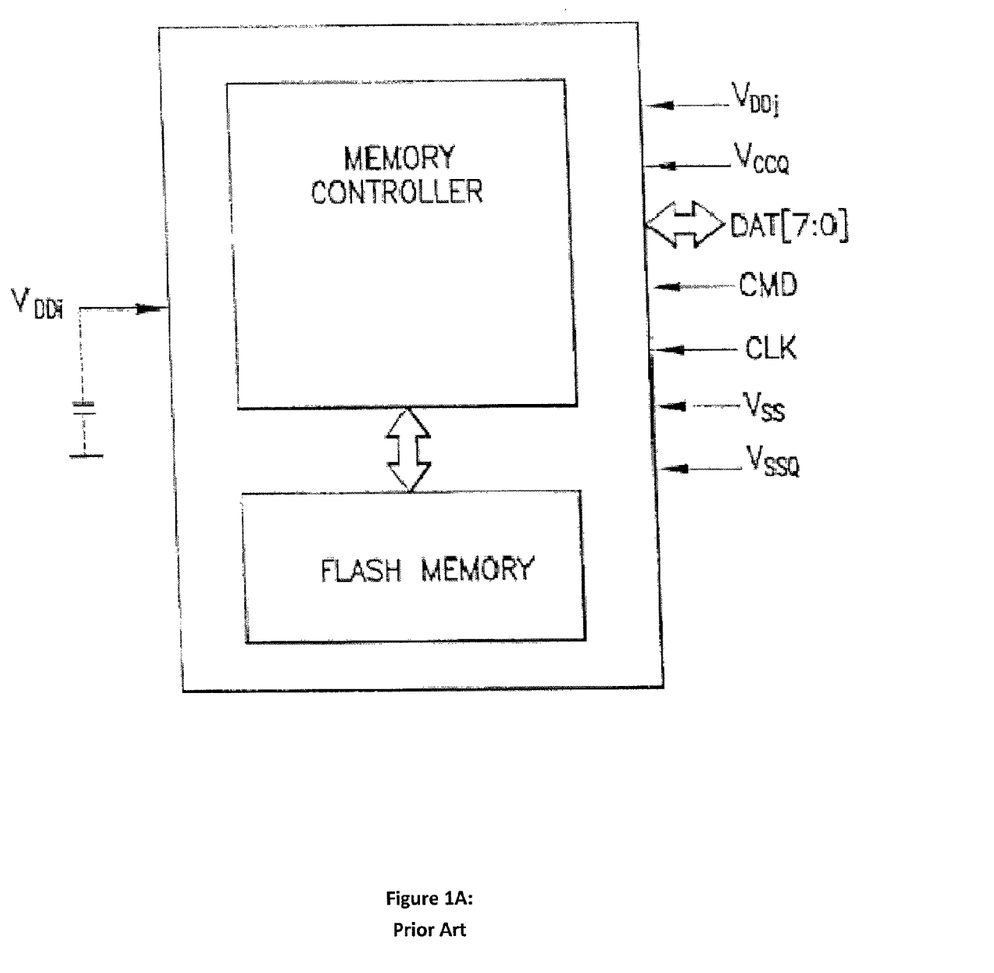
FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC.

FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC. The JEDEC eMMC includes, in addition to the flash memory itself, an intelligent on-board controller that manages the MMC communication protocol. The controller also handles block-management functions such as logical block allocation and wear leveling. The interface includes a clock (CLK) input. Also included is a command (CMD), which is a bidirectional command channel, used for device initialization and command transfers. Commands are sent from a bus master to the device, and responses are sent from the device to the host. Also included is a bidirectional data bus (DAT[7:0]). The DAT signals operate in push-pull mode. By default, after power-up or RESET, only DAT0 is used for data transfer. The memory controller can configure a wider data bus for data transfer using either DAT[3:0] (4-bit mode) or DAT[7:0] (8-bit mode).

Figure 1B:
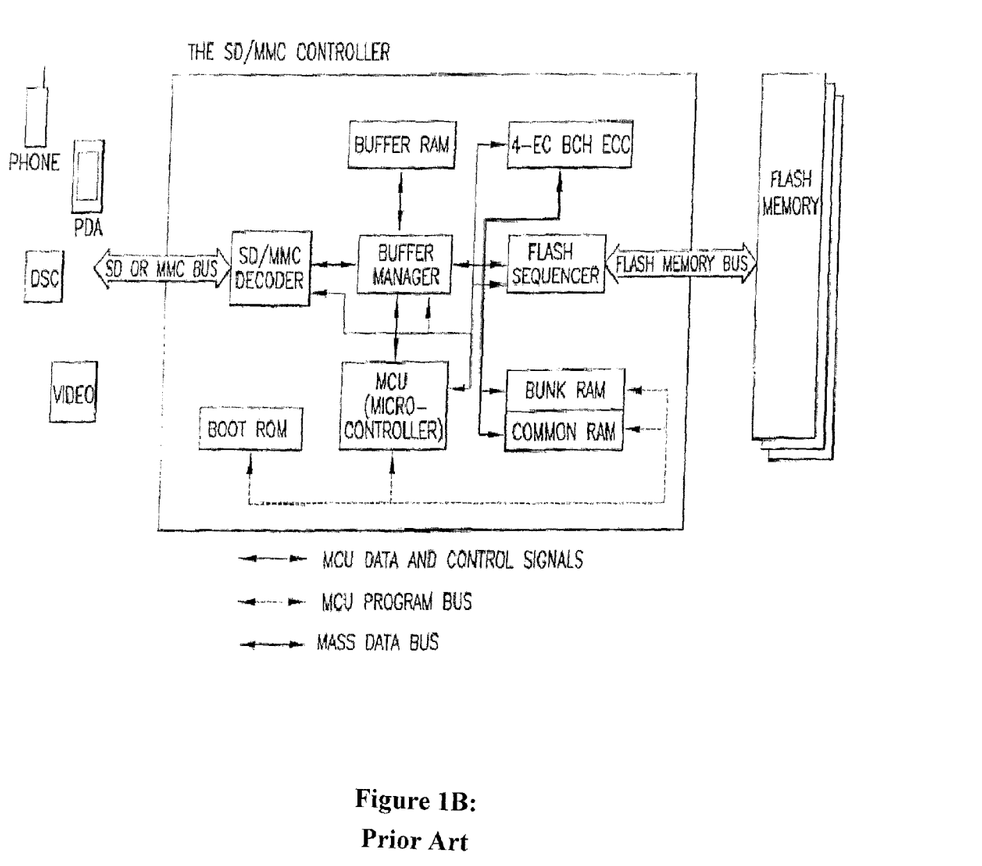
FIG. 1B reproduces FIG. 1 of Lin et al., and shows an example of an overall block diagram of a NAND flash controller architecture for a SD/MMC card.

One non-limiting example of a flash memory controller construction is described in "A NAND Flash Memory Controller for SD/MMC Flash Memory Card", Chuan-Sheng Lin and Lan-Rong Dung, IEEE Transactions of Magnetics, Vol. 43, No. 2, February 2007, pp. 933-935 (hereafter referred to as Lin et al.) FIG. 1B reproduces FIG. 1 of Lin et al., and shows an overall block diagram of the NAND flash controller architecture for a SD/MMC card. The particular controller illustrated happens to use a w-bit parallel Bose-Chaudhuri-Hocquengham (BCH) error-correction code (ECC) designed to correct random bit errors of the flash memory, in conjunction with a code-banking mechanism.

Performances of the mass memory device and of the host device utilizing the mass memory device are highly dependent on the amount of resources that are available for the memory functions. Such resources have traditionally been the central processing unit (CPU), random access memory (RAM) and also non-volatile memory such as for example non-volatile execution memory type (NOR) or non-volatile mass memory type (NAND). Resource availability also affects reliability and usability of the mass memory device. Most host/mass memory systems currently in commerce utilize a fixed allocation of resources. In traditional memory arrangements the CPU has some means to connect to the RAM and to the non-volatile memory, and these memories themselves have the resources needed for their own internal operations. But since that paradigm became prevalent the variety of resources has greatly increased, for example it is now common for there to be multi-core CPUs, main/slave processors, graphics accelerators, and the like.

In the managedNAND type of memory (such as eMMC, SSD, UFS, microSD) the memory controller can take care of the flash management functions like bad block management and wear leveling. In a typical low cost implementation there is only small IO buffer/work memory SRAM in the managedNAND, embedded in the controller. For example in higher end managedNANDs like SSDs there may be tens-hundreds of megabits of discrete DRAM as cache, but in the future some new memory technology like MRAM could serve as very fast non-volatile cache as well.

Co-owned U.S. patent application Ser. No. 12/455,763 (filed Jun. 4, 2009) details an example in which there is one NAND where the NAND flash translation layer (FTL, a specification by the Personal Computer Memory Card International Association PCMCIA which provides for P2L mapping table, wear leveling, etc.) occurs side by side by the main CPU. Co-owned U.S. patent application Ser. No. 13/358,806 (filed Jan. 26, 2012) details examples in which eMMC and UFS components could also use system dynamic random access memory (DRAM) for various purposes in which case the system CPU would not do any relevant memory-processing.

SUMMARY

According to a first embodiment of the invention, a method, comprising: reserving by at least one cache module of a host device, or receiving a reservation from the host device for, memory resource allocations in the at least one cache module individually reserved for one or more of a plurality of memory modules comprised in the host device; receiving by the at least one cache module from at least one module of the plurality of memory modules a request to use memory resources available in the at least one cache module; implementing the request by the at least one cache module using at least one resource of the memory resources in the at least one cache module, wherein the at least one resource of the memory resources in the at least one cache module is previously reserved for the at least one module, or dynamically identified by the at least one cache module.

According to a second embodiment of the invention, a method, comprising: reserving by a host device during manufacturing stage of the host device a memory resource allocation in at least one cache module individually for one or more memory modules comprised in the host device using information about each of the one or more memory modules comprising at least one or more of: a device identification, a device class identification and a device memory type of the at least one module; and providing by the host device the reserved memory resource allocation to the at least one cache module and corresponding individual memory resource allocations along with an identification of the at least one cache module individually to each of the one or more memory modules.

According to a third embodiment of the invention, an apparatus comprising: at least one controller and a memory optionally storing a set of computer instructions, in which the controller and the memory optionally storing the computer instructions are configured to cause the apparatus to: reserve by the apparatus in a host device, or receiving a reservation from the host device for, memory resource allocations in the apparatus individually reserved for one or more of a plurality of memory modules comprised in the host device; receive from at least one module of the plurality of memory modules a request to use memory resources available in the apparatus; implement the request using at least one resource of the memory resources in the apparatus, wherein the at least one resource of the memory resources in the apparatus is previously reserved for the at least one module, or dynamically identified by the apparatus.

According to a fourth embodiment of the invention, an apparatus comprising: at least one processor and a memory storing a set of computer instructions, in which the processor and the memory storing the computer instructions are configured to cause the apparatus to: reserve during manufacturing stage of the apparatus a memory resource allocation in at least one cache module individually for one or more memory modules comprised in the apparatus using information about each of the one or more memory modules comprising at least one or more of: a device identification, a device class identification and a device memory type of the at least one module; and provide the reserved memory resource allocation to the at least one cache module and corresponding individual memory resource allocations along with an identification of the at least one cache module individually to each of the one or more memory modules.

BRIEF DESCRIPTION OF THE DRAWINGS

In the attached Drawing Figures:

FIG. 5 is a table of different configuration phase options with a cache module according to selected embodiments;

DETAILED DESCRIPTION

Frequently the embedded memory in the controller is not sufficient to store all the run time data needed by the memory module and thus some portion of the run time data is stored/mirrored in a non-volatile memory (e.g., NAND) of the module. This is also necessary to avoid loss of critical (operation) data in case of sudden power down. The non-volatile memory, such as NAND, is very slow for storing/reading such data, if compared to typical execution memories like SRAM/DRAM. This causes delay to operation of the memory module and wears out the mass memory faster. For example, after power up the whole mass memory subsystem needs to be re-initialized from NAND and this may take time up to 1 second (e.g., in the eMMC, SD, SATAIO devices). The issue is even more troublesome in case of introduction of networked memory (or other, like IO) devices connected to some port in a host chipset, each memory/IO device lacking some resources.

Figure 2:
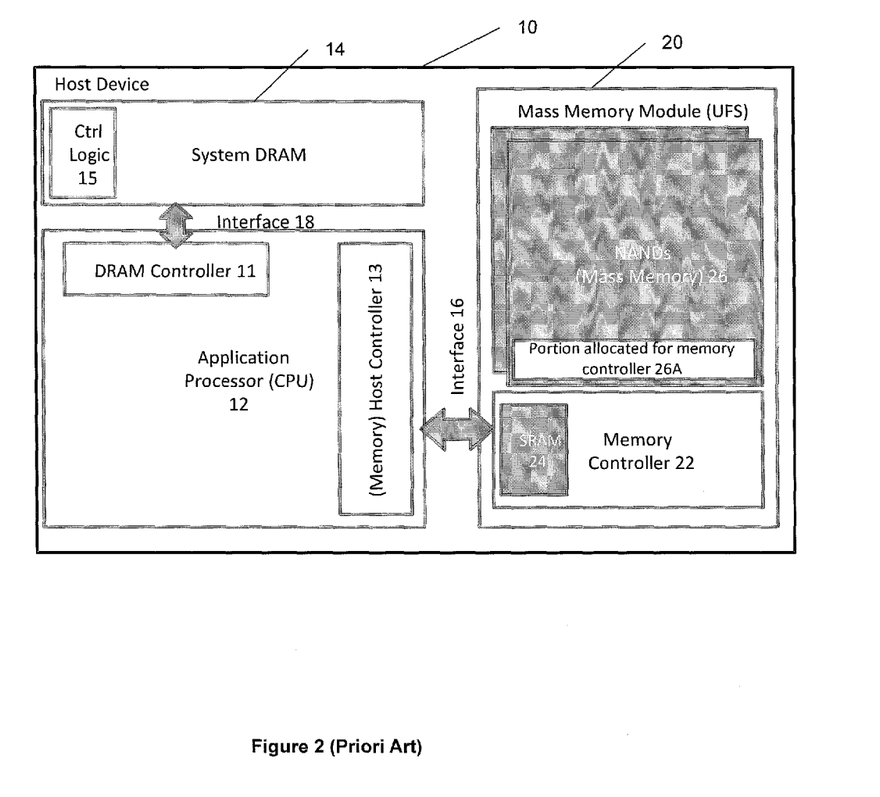
FIG. 2 is a block diagram of a managedNAND memory module inside a host mobile device.

FIG. 2 shows an exemplary block diagram of a conventionally managed NAND memory module (mass memory module) 20 inside a host mobile device 10.

A portion of the system RAM (e.g., DRAM) 14 (having a control logic 15) may be allocated for use by the mass memory module 20 (described here in a non-limiting embodiment as a UFS memory module or a memory module). The host device 10 includes an application processor that can be embodied as a CPU 12. Included with or coupled to the application processor 12 may be a DRAM controller 11 for the DRAM 14 (communication with the DRAM 14 is through an interface 18). Also present is the above-mentioned mass memory module 20 (e.g., UFS module) a host controller 13. The host controller 13 can be embodied as the CPU 12 or it can be embodied as a separate device. The mass memory module (MMM) 20 may be connected to the host device through an interface 16, e.g., via a bus (e.g., the mass storage memory bus). Also the memory module 20 can be a part of the host device 10 as shown in FIG. 2 or it may be a separate device (e.g., a memory card).

Furthermore, the memory module 20 may comprise a non-volatile memory NAND 26 (or in general mass memory, flash memory, etc.) with a portion 26A allocated for the memory controller and a memory controller 22 with an SRAM 24. It should be noted that an execution memory 24 of the memory controller 22 and/or the host system memory 14 could be a non-volatile memory such as MRAM, PCRAM and/or RRAM.

A new method, apparatus and software related product (e.g., a computer readable memory) are presented for using a cache/central cache module/device (instead of, e.g., system DRAM) which can serve multiple memory modules/devices. Each memory/IO module/device connected to the same memory network (e.g., via hub, bus, etc.) may utilize memory resources of this cache module/device either in a fixed manner using pre-set allocation of resources per the memory module/device, or dynamically using run-time allocation of new resources to an existing module/device per its request or to a new module/device connecting to the memory network (e.g., comprised in a host device) and possibly requesting memory resources. The host device may be a computer, a cellular phone, a digital camera, wireless or wired device, a gaming device or a PDA, as several non-limiting examples.

Figure 3:
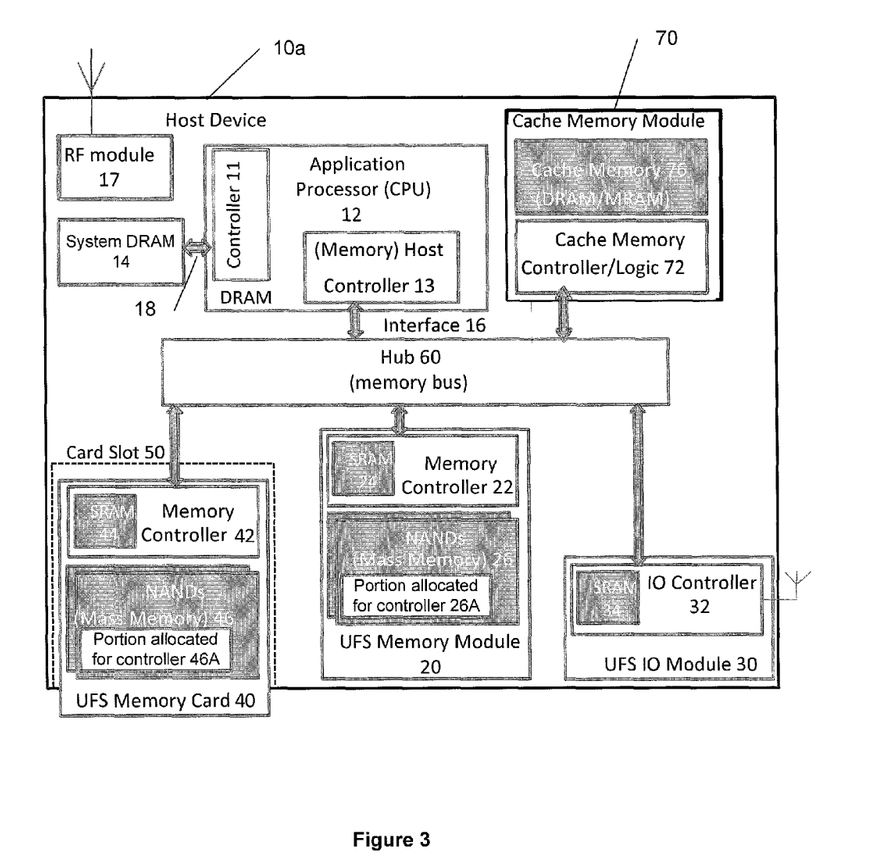
FIG. 3 is a block diagram of a host mobile device with a (central) cache module and a plurality of memory/IO modules inside of the host mobile device, according to an exemplary embodiment.

FIG. 3 illustrates an exemplary non-limiting embodiment of a host wireless/device 10a (such as mobile phone) comprising a central cache memory module/device (cache module) 70. An RF module 17 (with an RF antenna) can provide wireless communication for the host device 10a. It is noted that those components described in reference to FIG. 2 are numbered accordingly.

The cache device 70 may comprise a cache memory 76 (e.g., comprising volatile and/or non-volatile memory, DRAM/MRAM, etc.) and a cache memory controller 72 (which may be a small processor, a logical circuit or the like). The cache module 70 can communicate through a hub 60 such as a memory bus with a plurality of memory modules/devices 20, 30 and 40 (e.g., UFS modules/devices) and with a memory host controller 13 comprised in the host device processor 12 as shown in FIG. 3.

The UFS memory module 20 is described in reference to FIG. 2 with an exception that, for example, managing operational state data for this module is provided by the cache module 70 (e.g., through the hub 60) and not by the host controller 13/system DRAM 14 (as in FIG. 2).

Another memory module/device served by the cache module 70 according to embodiments describe herein may be an IO memory module 30 which can have an IO controller 32 with a SRAM 34 and radio antenna/capabilities to provide wireless communications (in network of memory/IO devices) in the host device 10a with other wireless devices/networks. It is noted that the module/device 30 may be a general purpose I/O module/device (having or not having a separate memory) in the host device 10a, but since the module/device 30 is served by the cache module 70, it is a part of a memory network comprising modules 20, 40 and 70. Therefore for the purpose of this invention all devices 20, 30 and 40 can be identified as memory modules/devices. In other words the term "memory/IO modules/devices is equivalent to the term "memory modules/devices".

Yet a further memory module shown in FIG. 3 served by the cache module 70 according to embodiments describe herein may be a memory (removable) card 40 inserted in a card slot 50 of the host device 10a. Furthermore, the memory card 40 may comprise a non-volatile NAND memory 46 (or mass memory, flash memory etc.) with a portion 46A allocated for the memory controller and a memory controller 42 with a SRAM 44. It should be noted that an execution memory 44 of the memory controller 42 could be a non-volatile memory such as MRAM, PCRAM and/or RRAM.

Each of the modules 20, 30, 40 and the central cache device 70 in the network 10a shown in FIG. 3 has a device ID number (device identification). Any new device connected to the network will have a device ID. Every device may also have a ClassID (device class identification) so that the type of device can be recognized (e.g., Class ID1 is a mass storage, ClassID2 is a IO module/device, ClassID9 is a central cache module/device, etc.). Yet another ID could relate to a memory type, for example MemoryTypeID1 is a non-volatile memory, MemoryTypeID2 is a volatile memory. The cache memory module 76 may comprise the volatile memory and/or the non-volatile memory.

In one embodiment, a pre-set allocation of memory resources for one or more memory modules (e.g., modules 20 and 30 of the host device 10a in FIG. 3) may be done in the host device 10a during manufacturing stage. For example, in time of production of a mobile device the connected components to the memory network (of memory/IO devices) are known, so are their Device IDs, Class IDs and Type IDs. Therefore the cache module/device 70 could be configured (e.g., by the manufacturing programmer/SW via the host controller 13) already in the production stage of the mobile device 10a so that different memory module/device IDs known to the cache module 70 would have certain allocation of resources in the cache module 70 (i.e., in the cache memory 76). Correspondingly, the modules/devices 20 and 30 may be configured so that they may know the resources which have been allocated to them and at which device ID address they can find their resources (e.g., this information may be stored into a register to which the corresponding memory module has access to).

Thus one or more memory resources in at least one cache module 70 may be reserved for one or more of the plurality of memory modules 20 and 30 of the host device 10a during manufacturing stage of the host device. The configuring of the one or more modules (e.g., modules 20 and 30) may be done by the host device at the manufacturing stage and then optionally confirmed at first powering of the host device 10a (which may not be necessary if the cache ID and allocation information is stored in the memory devices during manufacturing stage, as described herein). In other words, at the first powering of the host device, the at least one cache module 70 may receive the one or more identity interrogation requests from the one or more of the plurality of memory modules such as the memory/IO modules 20 and 30. The cache module may respond to the identity interrogation requests by handshakes with the one or more of the plurality of memory modules which can include providing the identification of the at least one cache module and may further include providing an identity of the reserved one or more memory resources to the corresponding one or more of the plurality of memory modules (modules 20 and 30).

In another embodiment, if pre-allocation/reservation of the memory resource in the cache module 70 may not be performed during manufacturing stage of the host device, it can be performed by the cache module 70 when requested by the memory modules in the network, typically at first powering or when a cache memory assistance is needed. In this case, the at least one cache module 70 may receive the one or more identity interrogation requests from the one or more of the plurality of memory modules such as memory/IO modules 20 and 30. Then the cache module can make appropriate resource reservations for the one or more memory modules and respond to the identity interrogation requests by handshakes with the one or more of the plurality of memory modules which can include providing the identification of the at least one cache module 70 and may further include providing an identity of the reserved one or more memory resources to the corresponding one or more of the plurality of memory modules (modules 20 and 30) as described herein.

In a further embodiment, a dynamic run-time allocation of memory resources in the cache module 70 for a particular memory module/device in the memory network may be performed in response to a specific request to use memory resources available in the cache module 70 from at least one memory module/device (e.g., module 20 or 30). The request may comprise at least a device identification, a device class identification and/or a device memory type of the at least one network device. Also the request may comprise an indication of a memory type (e.g., volatile or non-volatile) which is needed.

The request processing by the cache memory controller 72 of the cache module 70 may comprise determining whether one or more resources of the available memory resources were previously reserved for the at least one memory module making the request, and if that is the case, using at least one reserved resource of the one or more reserved resources for implementing the request.

However, if no memory resources were previously reserved for the at least one memory module (e.g., like it may be for the memory card 40 as further discussed herein), then the cache module 70 may identify at least one available resource or multiple resources (not reserved or used) of the memory resources in the cache module 70 for responding to the request from the at least one memory module.

Also according to another embodiment, if the one or more resources were previously reserved for the at least one module but already all used or not sufficient for implementing the request, the cache module 70 may identify at least one available resource (or more than one resource if needed) of the memory resources not previously reserved, and use the identified resource(s) for implementing the request.

Moreover, the request from the at least one memory module/device may comprise a writing operation, so that the writing operation can be performed by the cache module 70 using the at least one resource (reserved or identified) at the cache module Also the request (optionally) may comprises a location or an identity of at least one memory resource in the cache module to use it for the requested writing operation.

Also, the request from the at least one memory device may comprise a reading operation, and an identity and/or a location of the requested information (previously written) in the cache memory 76, so that the cache memory controller 72 can identify one or more resources where the requested information is stored and perform the reading operation.

According to a further embodiment, when a new memory module/device (removable module/device) like the memory card 40 is added to the host device 10a as shown in FIG. 3, this added memory card 40 can send to the cache module 70 an identity interrogation request to identify cache memory module/device available in the memory network. Then only the cache module 70 will respond to the identity request from the memory card 40 by a handshake with the added memory card 40 which may include providing identification of the cache module 70 to the added memory card 40. Also optionally, the cache module 70 may reserve at least one further resource (or multiple resources) of the available memory resources in the cache memory 76 for the added memory card 40 and provide an identity of these reserved resource(s) to the added memory card 40.

It is further noted that optionally the identity interrogation request sent by the added memory card 40 may also comprise a request to use memory resources in the cache module 70. In this case, as described herein, the cache module 70 may identify at least one available resource or multiple resources (not reserved or used) of the memory resources in the cache module 70 for responding to the request from the added memory card 40. Also these resources used for responding to the request may be then reserved permanently in the cache module 70 for the added memory card 40 for future transactions until the memory card 40 is removed from the host device 10a.

It is further noted that a device like the cache module/device 70 may be a standalone component in the memory network/host device. Also it can have different functions, e.g., acting as a switch in the network. Moreover, it could be integrated into any of the other memory modules/devices (like a mass memory device or an IO device).

It is further notes that the host device could inform the memory/IO modules connected in the memory network about existence of the cache module (e.g. confirming the existence of the CacheDeviceID) during the initialization phase of the memory/IO module. This would remove the requirement of interrogating the CacheDeviceID by the memory/IO modules/devices connected in the memory network. Further, the host device could also configure both the memory/IO modules/devices and the cache module during the initialization, e.g. by configuring/linking the DeviceIDs and corresponding cache memory resources (e.g., address ranges).

Figure 4:
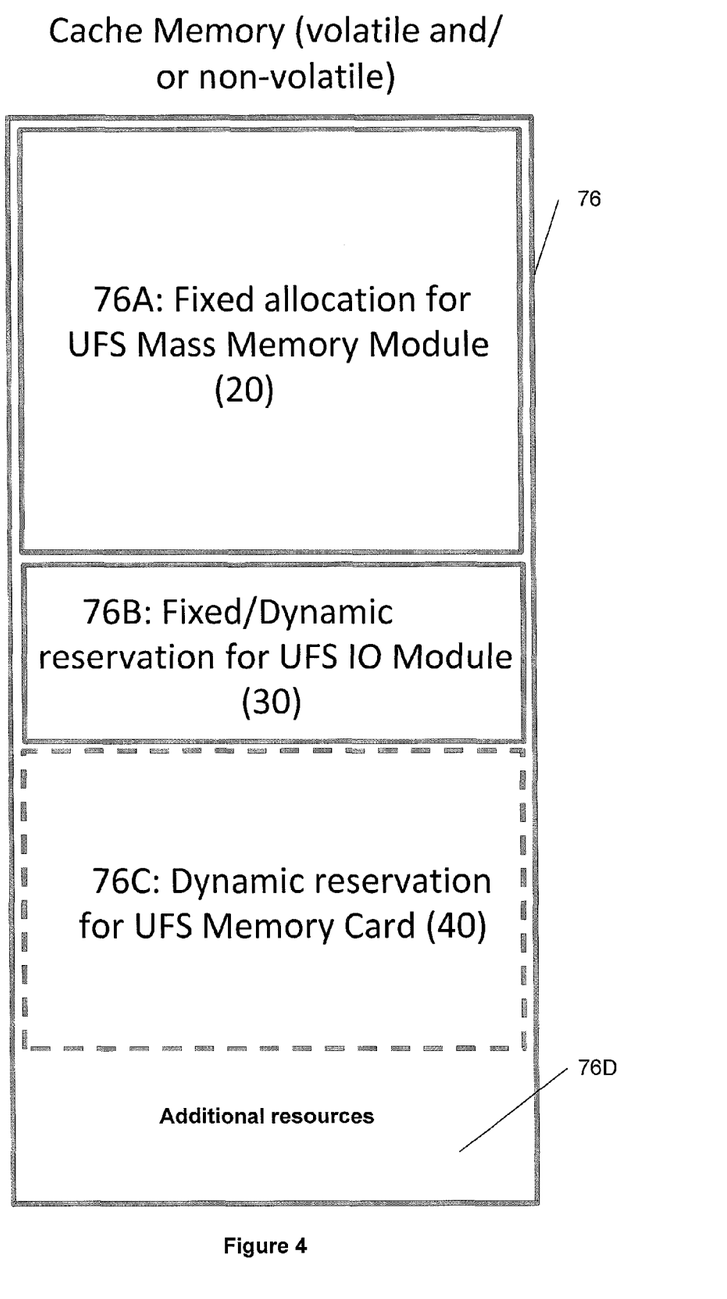
FIG. 4 is a memory map of a cache memory, according to an exemplary embodiment.

FIGS. 4, 5, 6a-6d and 7 further demonstrate different embodiments described herein. FIG. 4 is an example of the cache memory 76 shown in FIG. 3 with three allocated areas 76A, 76B and 76C for corresponding modules 20, 30 and 40. A memory area 76D represents additional resources which can be used in "emergencies", i.e., when the allocated resource(s) are not sufficient to meet a particular request from the memory module 20, 30 or 40. Also area 76D may be used for further resource allocation/reservation for added memory devices/modules like the removable memory card 40.

Furthermore, each memory area 76A, 76B, 76C or 76D may comprise volatile and non-volatile sectors which may be used according to the need/request from the memory modules in the memory network. Alternatively, it may be more than one cache memory modules like module 70 in the host device 10a. For example, one cache module may comprise a volatile memory and another cache module may comprise a non-volatile memory, so that their corresponding controllers will coordinate their performance.

FIG. 5 briefly summarizes three different modes of operation of the cache module: during production (first column), during power boot up (second column) and during connecting a new memory device (third column).

Figure 6A:
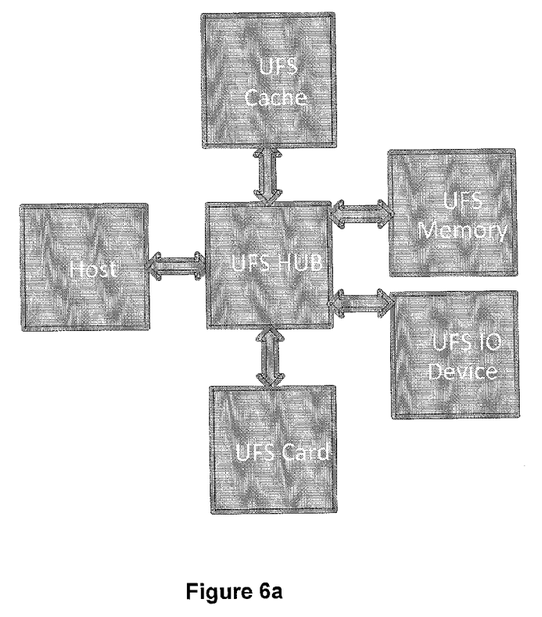
FIGS. 6a-6d are diagrams of different topology options using a cache module/device, according to exemplary embodiments.
Figure 6B:
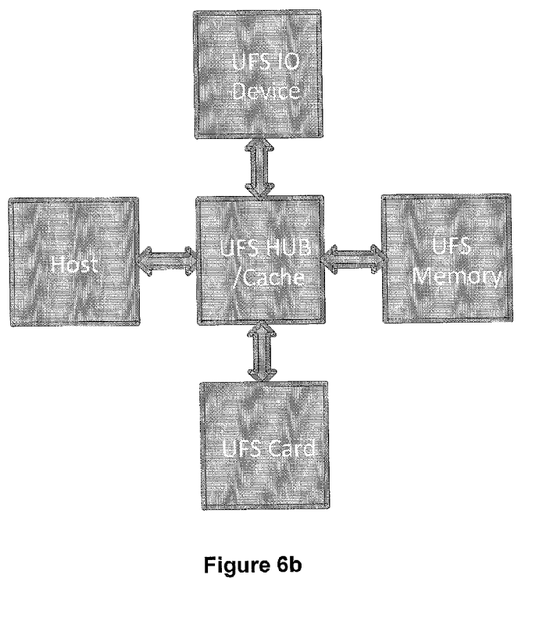
Figure 6C:
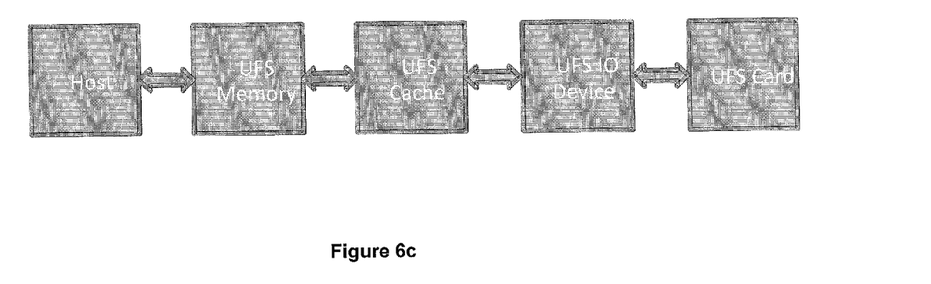
Figure 6D:
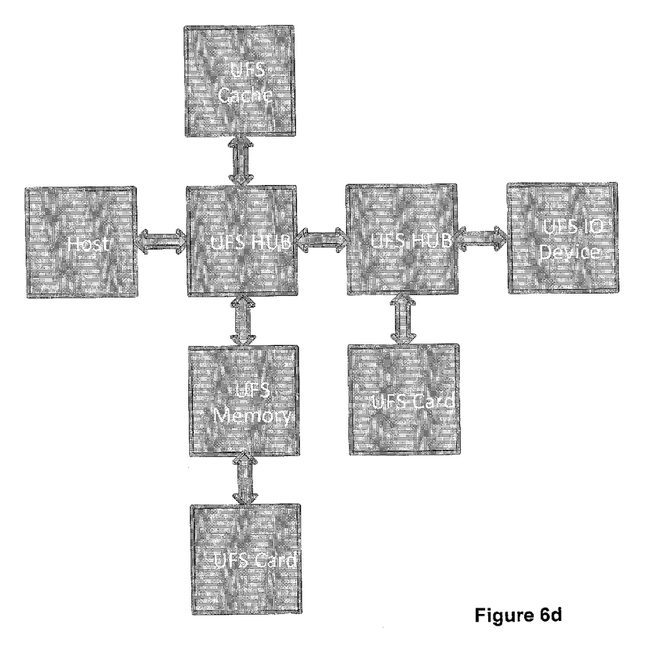

FIGS. 6a-6d illustrate exemplary topology options utilizing a central cache module in a UFS memory network. The topology shown in FIG. 6a corresponds to the topology of FIG. 3 described herein. FIG. 6b shows a topology similar to FIG. 5a, but the cache module is placed in the UFS hub. FIG. 6c demonstrate a serial/chain connection of different memory modules/devices, and FIG. 6d shows a mixed topology incorporating features of FIGS. 6a and 6c.

Figure 7:
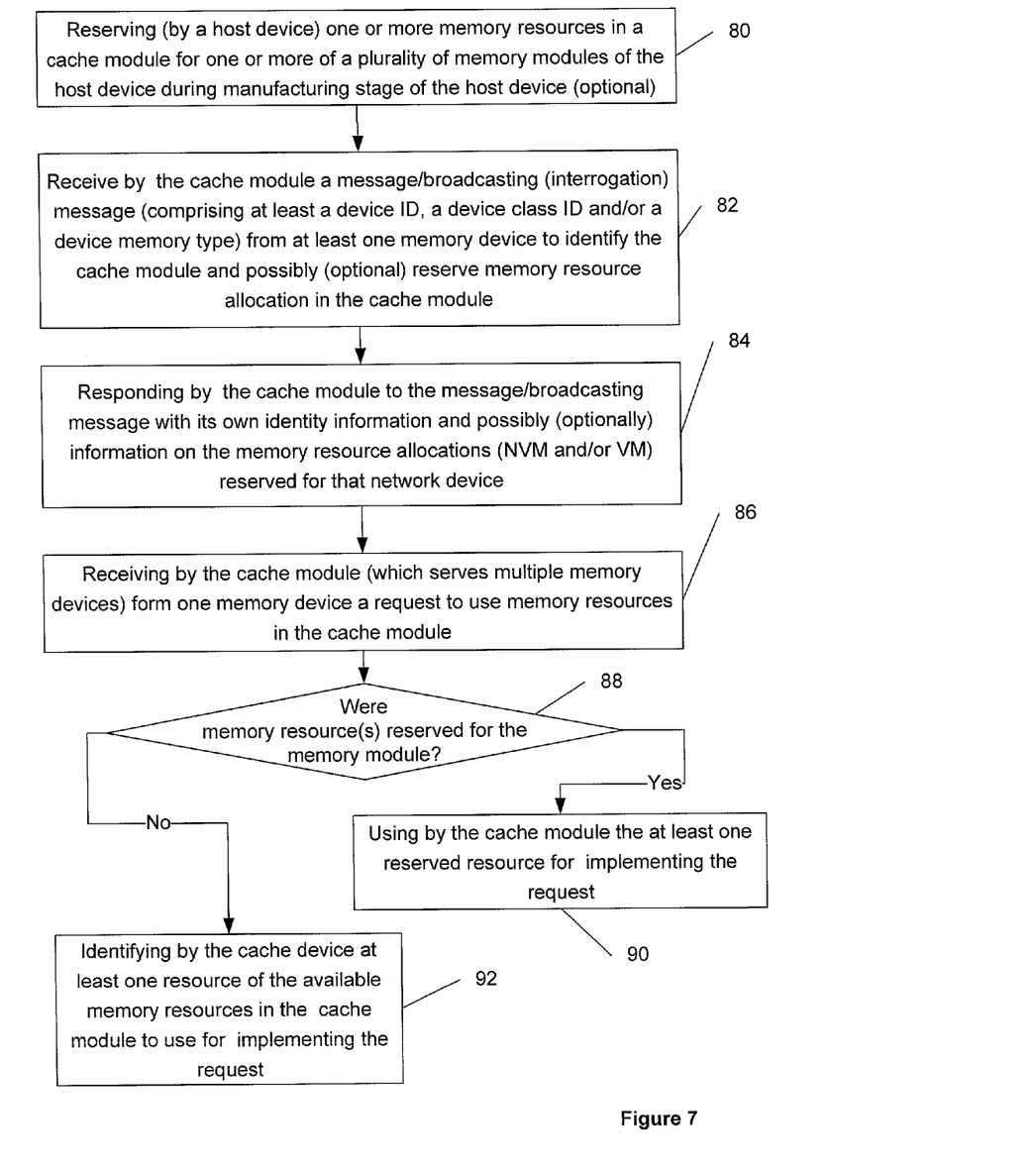
FIG. 7 is a flow chart demonstrating an exemplary embodiment performed by a cache module.

FIG. 7 shows a logic flow diagram that illustrates the operation of a method involving the (central) cache module in a memory network, and a result of execution of computer program instructions embodied on a computer readable memory, further in accordance with the exemplary embodiments of the invention as described herein. It is noted that the order of steps shown in FIG. 7 is not absolutely required, so in principle, the various steps may be performed out of the illustrated order. Also certain steps may be skipped, different steps may be added or substituted, or selected steps or groups of steps may be performed in a separate application.

In a method according to the exemplary embodiments, as shown in FIG. 7, in a first step 80, one or more memory resources in a cache module are reserved by a host device for one or more of the plurality of memory modules comprised in the host device during manufacturing stage of the host device (optional step).

In a next step 82, the cache module (serving multiple memory modules/devices) receives a message/broadcasting (interrogation) message (comprising at least a device ID, a device class ID and/or a device memory type) from at least one memory module/device to identify the cache module and possibly (optionally) reserve memory resource allocation in the cache module. In a next step 84, the cache module responds to such message/broadcasting message with its own identity information and possibly (optionally) information on the memory resource allocations (e.g., in NVM and/or VM) reserved by the cache module for that memory module/device.

In a next step 86, the cache module receives from a memory module a request to use memory resource(s) in the cache device for a specific purpose. In a next step 88, it is determined (by the cache module) whether the memory resource(s) were reserved for that network device. If that is the case, in a next step 90, the cache module would use the at least one reserved resource for implementing the request. If however, it is determined that the memory resource(s) were not reserved for the memory module, in a step 92, the cache module would identify at least one resource of the available memory resources in the cache module to use for implementing the request or could reply with a rejection message due to a lack of available resources.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
    reserving, by at least one cache module of a host device, one or more memory resource allocations of memory resources in the at least one cache module, the one or more memory resource allocations being reserved for one or more memory modules;
    providing, by the at least one cache module, an identification of the at least one cache module to at least one memory module;
    receiving, by the at least one cache module and from the at least one memory module, a request to use at least part of the memory resources in the at least one cache module; and
    implementing, by the at least one cache module, the request using at least one memory resource of the memory resources in the at least one cache module,
    wherein the at least one memory resource of the memory resources in the at least one cache module is:
        previously reserved for the at least one memory module based at least in part on the one or more memory resource allocations, or
        dynamically identified by the at least one cache module.

2. The method of claim 1, wherein implementing the request comprises:
    determining, by the at least one cache module, whether one or more memory resources of the memory resources were previously reserved for the at least one memory module.

3. The method of claim 2, wherein implementing the request further comprises:
    if the one or more memory resources were previously reserved for the at least one memory module, using the at least one memory resource of the one or more memory resources for implementing the request, and
    if the one or more memory resources were not previously reserved for the at least one memory module, identifying, by the at least one cache module, the at least one memory resource of the one or more memory resources not previously reserved for the at least one memory module for implementing the request.

4. The method of claim 2, wherein implementing the request further comprises:
    if the one or more memory resources were previously reserved for the at least one memory module but the one or more memory resources were all used or not sufficient for implementing the request,
    identifying, by the at least one cache module, the at least one memory resource of the memory resources other than the one or more memory resources previously reserved for the at least one memory module for implementing the request.

5. The method of claim 1, wherein the host device comprises a mobile device for wireless communications.

6. The method of claim 1, wherein the one or more memory modules comprise at least one of: a mass memory module, a removable memory module and an input/output memory module.

7. The method of claim 1, wherein the request to use the at least part of the memory resources in the at least one cache module comprises at least one of: an identification of the at least one memory module, a class identification of the at least one memory module and a memory type of the at least one memory module.

8. The method of claim 1, wherein the at least one cache module comprises:
volatile memory,
non-volatile memory, or
both volatile and non-volatile memory, wherein the request to use the at least part of the memory resources in the at least one cache module comprises an indication of a volatile or non-volatile memory type in the at least one cache module.

9. The method of claim 1, wherein the request to use the at least part of the memory resources in the at least one cache module comprises a writing operation to be performed by the at least one cache module using the at least one memory resource of the memory resources in the at least one cache module, where the request comprises a location or an identity of the at least one memory resource in the at least one cache module to use for the writing operation.

10. The method of claim 1, wherein the request to use the at least part of the memory resources in the at least one cache module comprises a reading operation, and an identity or a location of information to be read, so the at least one cache module is configured to identify the at least one memory resource of the memory resources where the information to be read is stored.

11. The method of claim 1, further comprising:
at a powering of the host device, receiving, by the at least one cache module, one or more identity interrogation requests from the one or more memory modules;
responding, by the at least one cache module, to the identity interrogation requests by handshakes with the one or more memory modules including providing an identification of the at least one cache module and further providing an identity of the one or more memory resource allocations.

12. The method of claim 1, wherein before receiving the request to use the at least part of the memory resources in the at least one cache module, the method further comprises:
receiving, by the at least one cache module, an identity interrogation request from an added memory module added to the host device, the added memory module being a removable module; and
responding, by the at least one cache module, to the identity interrogation request from the added memory module by a handshake with the added memory module, the handshake comprising provision of the identification of the at least one cache module to the added memory module.

13. The method of claim 12, wherein the handshake further comprises:
reserving, by at least one cache module, at least one further memory resource of the memory resources for the added memory module; and
providing an identity of the at least one further memory resource to the added memory module.

14. The method of claim 12, wherein the added memory module is the at least one memory module making the request to use at least part of the memory resources in the at least one cache module.

15. The method of claim 12, wherein the identity interrogation request comprises the request to use the at least part of the memory resources in the at least one cache module.

16. An apparatus comprising:
at least one controller and a memory storing computer instructions configured to cause the apparatus to:
reserve, in a host device, one or more memory resource allocations of memory resources in the apparatus, the one or more memory resource allocations being reserved for one or more memory modules;
provide an identification of the apparatus to at least one memory module;
receive, from the at least one memory module, a request to use at least part of the memory resources in the apparatus; and
implement the request using at least one memory resource of the memory resources in the apparatus by determining that the at least one memory resource of the memory resources in the apparatus has been previously reserved for the at least one memory module based at least in part on the one or more memory resource allocations.

17. The method of claim 1, wherein the host device is associated with a plurality of memory modules and the plurality of memory modules comprises at least the one or more memory modules.

18. The apparatus of claim 16, wherein the host device is associated with a plurality of memory modules and the plurality of memory modules comprises at least the one or more memory modules.

19. An apparatus comprising:
at least one controller and a memory storing computer instructions configured to cause the apparatus to:
reserve, in a host device, one or more memory resource allocations of memory resources in the apparatus, the one or more memory resource allocations being reserved for one or more memory modules;
provide an identification of the apparatus to at least one memory module;
receive, from the at least one memory module, a request to use at least part of the memory resources in the apparatus; and
implement the request using at least one memory resource of the memory resources in the apparatus by dynamically identifying the at least one memory resource of the memory resources in the apparatus.

20. The apparatus of claim 19, wherein the host device is associated with a plurality of memory modules and the plurality of memory modules comprises at least the one or more memory modules.

21. An apparatus comprising:
at least one controller and a memory storing computer instructions configured to cause the apparatus to:
receive, from a host device, one or more memory resource allocations of memory resources in the apparatus, the one or more memory resource allocations being reserved for one or more memory modules;
provide an identification of the apparatus to at least one memory module;
receive, from the at least one memory module, a request to use at least part of the memory resources in the apparatus; and
implement the request using at least one memory resource of the memory resources in the apparatus, wherein the at least one memory resource of the memory resources in the apparatus is:
    previously reserved for the at least one memory module based at least in part on the one or more memory resource allocations, or
    dynamically identified by the apparatus.

22. The apparatus of claim 21, wherein the host device is associated with a plurality of memory modules and the plurality of memory modules comprises at least the one or more memory modules.

* * * * *